United States Patent
Varga et al.

[11] Patent Number: 5,839,816
[45] Date of Patent: Nov. 24, 1998

[54] ROAD MARKER

[75] Inventors: Zoltan A. Varga, London; Murray B. Corless, Springfield; John D. Pinnock, London, all of Canada

[73] Assignee: ATSI, LLC, Dunkirk, N.Y.

[21] Appl. No.: 571,790

[22] Filed: Dec. 13, 1995

[30] Foreign Application Priority Data

Jul. 13, 1995 [CA] Canada ................................ 2153819

[51] Int. Cl.$^6$ ................................................ E01F 9/00
[52] U.S. Cl. .................... 362/153.1; 362/183; 362/364; 362/369; 362/800
[58] Field of Search ........................... 362/153.1, 183, 362/806, 364, 369; 315/151, 157; 404/9, 12, 13; 340/908, 908.1, 932, 331, 332; 320/4, 5, 13, 14, 32, 39

[56] References Cited

U.S. PATENT DOCUMENTS

| | | |
|---|---|---|
| 1,572,214 | 2/1926 | McEwing et al. .............. 362/153.1 |
| 1,708,108 | 4/1929 | Rolph . |
| 1,952,942 | 1/1934 | Ross . |
| 2,126,224 | 9/1938 | Shaffer et al. . |
| 2,246,098 | 6/1941 | Jaeckel . |
| 2,260,498 | 10/1941 | Wise . |
| 2,308,525 | 1/1943 | Lowe . |
| 3,096,024 | 7/1963 | Young . |
| 3,257,552 | 6/1966 | Converso . |
| 3,302,168 | 1/1967 | Gray et al. .............. 340/932 |
| 3,836,275 | 9/1974 | Finch . |
| 4,050,834 | 9/1977 | Lee . |
| 4,070,095 | 1/1978 | Suhr ........................... 404/12 |
| 4,174,184 | 11/1979 | Heenan . |
| 4,314,198 | 2/1982 | Rogers ......................... 320/5 |
| 4,358,217 | 11/1982 | Stone . |
| 4,382,274 | 5/1983 | DeBacker et al. . |
| 4,394,715 | 7/1983 | Dahlberg . |
| 4,668,120 | 5/1987 | Roberts . |
| 4,685,824 | 8/1987 | Eigenmann . |
| 4,697,950 | 10/1987 | Copeland . |
| 4,904,998 | 2/1990 | Niimi ........................... 340/908 |
| 4,925,335 | 5/1990 | Eigenmann . |
| 4,993,868 | 2/1991 | Eigenmann . |
| 5,006,010 | 4/1991 | Duckett . |
| 5,013,181 | 5/1991 | Harrison . |
| 5,032,961 | 7/1991 | Pouyanne et al. . |
| 5,074,706 | 12/1991 | Paulos . |
| 5,252,893 | 10/1993 | Chacham et al. ............ 362/153.1 |
| 5,262,756 | 11/1993 | Chien ........................... 340/331 |
| 5,280,220 | 1/1994 | Carter ........................... 315/159 |
| 5,412,381 | 5/1995 | Dicks . |
| 5,438,495 | 8/1995 | Ahlen et al. . |
| 5,453,663 | 9/1995 | Nakayama . |

Primary Examiner—Sandra L. O'Shea
Assistant Examiner—Matthew J. Spark
Attorney, Agent, or Firm—Dykema Gossett PLLC

[57] ABSTRACT

A road marker is flush with and preferably slightly below the grade of the surface of the road and may be either solar operated, recharging batteries within it so that light emitting diodes which are connected to the battery source may be turned on during darker night conditions to provide illumination along the boundary lines between traveling lanes along the highway. The surface of the delineator, is profiled to provide a central depression or floor with end inclined walls, at least one of which may carry a light retro-reflective media. Light emitting elements that gain their electrical power from a battery source which itself is energized and recharged by a solar collector occupying most of the surface area of a central depression. The end walls are inclined holding the light emitting diodes, below grade and out of harm's way; the emanating light projects toward an oncoming vehicle, or in a more simplistic version, the same region has a light retro-reflective media which reflects light back to the driver of an oncoming vehicle when its lights are turned on. The marker also includes battery power management, a shock resistant sandwich structure, is networkable, may be field programmable, can distinguish artificial from natural light, and includes an integrated lens/LED assembly. The road maker is made with a peelable label over the light detector for easy removal and activation. The road maker also may be consistently installed by use of disclosed installation tabs.

33 Claims, 9 Drawing Sheets

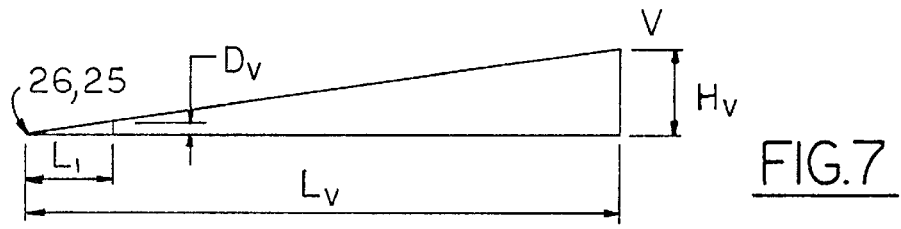
FIG.7
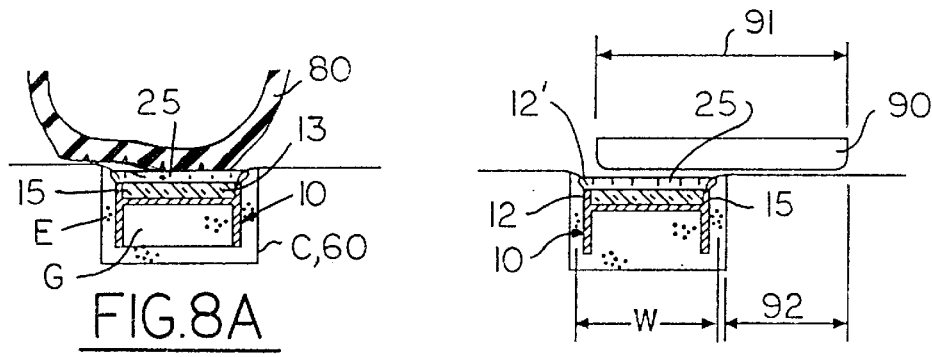
FIG.8A
FIG.8B
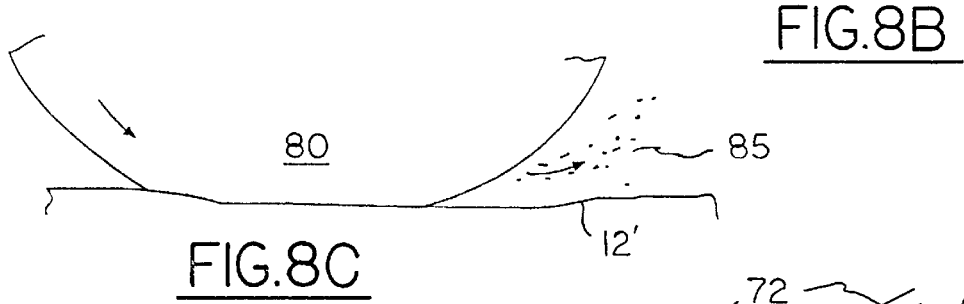
FIG.8C
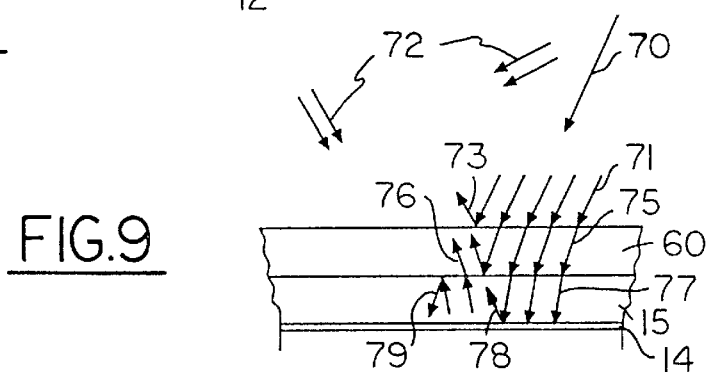
FIG.9
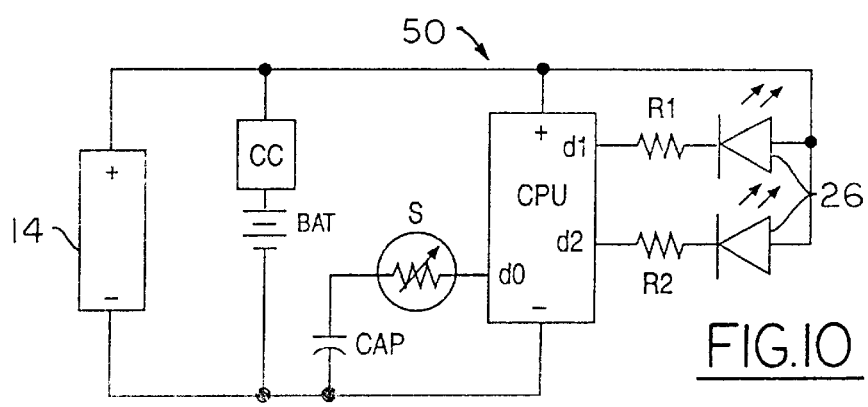
FIG.10

ROAD MARKER

BACKGROUND OF THE INVENTION

1. Field of the Invention

This invention relates to a road marker. Particularly, the road marker is a subterranean road marker designed to be placed into a paved surface of a highway or roadway, but at an elevation coincident with or below the grade of the road and to locate below grade a light emitting region which might be either light retro-reflective, or a light source, or a combination of both.

2. Description of the Related Art

Over intervening years, various types of road markers have been proposed to delineate the traffic lanes or boundaries along a road. Some operate effectively in warmer climates where there is no snow accumulation while others have been designed to be more effective in those temperate climates where there is significant accumulation of snow during the winter season, for example, those States of the United States of America that border the Great Lakes and Canada and of course, throughout Canada; typically these are of a group being a rigid and fixed road delineator which is embedded into the surface of the road, has a protective surround which surmounts the surface plane or grade of the road, while also surrounding a light retro-reflective lens. A popular embodiment of this class of above grade retro-reflective lens road markers is one manufactured by the STIMSONITE CORPORATION of Chicago, Ill., U.S.A. Another type of road marker, which is embedded into the road and surmounts the surface plane of the road, is a refractive delineator such as one disclosed by KONE in U.S. Pat. No. 3,393,506 issued 20 Dec., 1966 for a ROAD MARKER. It is spring loaded, carrying retro-reflective surfaces, biasingly held at an elevation above road grade, so that when traffic or snowplows go over the same, the retro-reflective elements of the marker depress into the marker housing, to below grade and out of harm's way, to pop up again after depression.

Both of these delineators have disadvantages, particularly in snow conditions with heavy snowplowing because the snowplow tends to hit the marker with such intensity as to shatter it away. Snowplow accidents have been known to happen when the corner of a snowplow blade has hit the marker, spinning the snowplow plow around on the icy surface of the road, normally existing beneath the snow that is being plowed by the snowplow. ROBERTS, in U.S. Pat. No. 4,668,120 issued 26 May, 1987 discloses a SOLAR-POWERED ILLUMINATED REFLECTOR which contains a self-contained-powered illuminating reflector to provide visibility at a distance as a traffic safety aid. It is mounted in an elevated housing, which surmounts the road surface; and, therefore, has the same disadvantages as the prior art road markers, referred to above.

One solution to these problems proposed by the prior art involves providing a solar-powered road marker that is mounted flush with the road grade. The solution, however, has proved unsatisfactory, although attractive on its face. To fully understand why the solution has failed, one should appreciate that a snowplow blade, as the snowplow moves down a roadway or the like, oscillates up and down, as a function of the snowplow speed. The downward movement imparts a tremendous striking force on the parts of the road that it strikes. In particular, a solar collector is glass-like and inflexible, and has the great tendency to shatter upon receipt of such a striking force, which is possible, since such road markers are only flush with the grade. Similarly, common roadway traffic, particularly an automobile tire, also has a tendency to shatter these solar panels due to the force.

Accordingly, there is a need to provide a road marker that eliminates or minimizes one or more of the problems as set forth above.

SUMMARY OF THE INVENTION

It is an object of the invention to provide a road marker which is preferably slightly below the grade or the surface of the highway; to provide a minimum road marker life span of approximately seven years; that remains in place notwithstanding snowplow resistance; yet provides adequate illumination, for night-time visibility, up to approximately 250–300 feet in the direction of oncoming traveling traffic toward the delineator. To achieve these and other objects of the invention, in one embodiment, the surface of the delineator is profiled to provide a central depression or floor with inclined end walls and preferably, vertical side walls outwardly flaring near the top which encourages debris removal from the effective upper surface of the floor. At least one inclined end wall carries a light dispersing media and that in the preferred embodiment, also includes light emitting elements. In a preferred embodiment, the floor of the depression carries a light absorbing surface or solar collector for charging a rechargeable battery within the delineator while end slopes from the floor to opposite upper ends of the marker housing provide angular positioning of light sources which may be powered by the battery, or be a light retro-reflective material.

Thus, in the preferred embodiment, the novel road marker illuminates itself, via a light source utilizing an energy source supplied to the light source that is enclosed within the unit itself and includes a rechargeable battery, a solar collector (photovoltaic cell or solar generator), and electronic control circuits to recharge the battery during ambient light conditions, either from direct or indirect sunlight and to energize the light source during threshold non-ambient light conditions.

In an alternate embodiment, the road marker is void of the energy source and the means by which it is recharged, including the light emitting devices, but provides light retro-reflective elements that return light toward the source of oncoming light, which is emitted from the headlights of an oncoming vehicle, the reflective light being returned back toward the vehicle and hence, through the windscreen or windshield, to the driver of that vehicle thus demarking, "by light", the road.

In another aspect of the invention, therefore, a road marker is adapted for insertion into a road surface to an elevation below that of the road surface, the marker comprising a housing having longitudinal side walls with upper margins, and housing ends, and an upper surface that defines a central recess with a floor, and at one floor end, a recess end wall that carries upwards into an adjacent housing end, and light dispensing means disposed in a plenum formed in at least one end of the marker. The light dispensing means may be either a light source, or light retro-reflective media. When the light dispensing means is a light source, central solar collector occupies the central recess which preferably is over covered by a light translucent sheet sealing the solar collector from the elements. Beneath the solar collector in plenums within the casting, is a rechargeable battery, light source in the end walls of the casting for light emitting diodes which may be gallium arsenide. During daylight hours, the battery is charged by a solar collector and during night time hours, the light emitting diode is illuminated. This is controlled by a central processing unit and an ambient light sensor and the necessary logic. Specifically, this embodiment includes a light transmissive member sealingly over covering the solar collector from the elements and the housing defining a plenum accommodating the battery, the light source, and the means for recharging the battery, wherein the means for recharging the battery includes a charge controller in series with the solar collector, the charge controller and solar collector being parallel with the battery. The upper surface of the light transmissive member is at an elevation below the flaring side walls.

In another aspect of the present invention, the upper margins of the housing sidewalls are at an elevation above an upper surface of the transparent sheet or member, to thereby provide mechanical protection for the solar collector. Thus, the oscillating blade of a snowplow is precluded from striking the central recess area of the road marker by way of the relative positioning of the upper margins of the housing sidewalls and the central recess.

In still another aspect of this invention, a road marker including a shock-resistant structure is provided. In particular, for a solar-powered road marker embodiment, a layer of light transmissive silicone is disposed upon and substantially overlays the solar collector, the transparent sheet overlaying the layer of silicone. The solar collector, the layer of silicone, and the transparent sheet define a shock-resistant sandwich, which improves the durability of the road marker.

In yet another aspect of this invention, a road marker is provided that includes the ability for preventing overcharging of its rechargeable battery. In one embodiment of this aspect of the invention, the solar-powered road marker includes means coupled to the battery for determining when the battery is in an over healthy state (i.e., when the battery output voltage exceeds an upper predetermined limit), and, generating a charge inhibit signal in response thereto. Such a road marker further includes means responsive to the charge inhibit signal for inhibiting further charging of the battery. This feature prevents overcharging and possible outgassing, which extend the life of the battery.

In another aspect of this invention, a solar-powered road marker is provided which includes the feature of full cycle discharging and recharging of the rechargeable battery system to minimize any potential memory effect, to thereby ensure the full rated life of the battery. In one embodiment of this aspect of the invention, the road marker includes means for providing full discharge and recharge of the battery through a software procedure that inhibits charge while the battery is discharged over a period of time, but which, permits charging after the battery has fallen below a predetermined lower voltage limit.

In still yet another aspect of this invention, a solar-powered road marker is provided that inhibits discharge of the battery (e.g., by halting the central processor) when the battery reaches a predetermined lower, safe output voltage. A road marker, in accordance with this aspect, includes means for determining when the battery has fallen below the predetermined, lower output voltage, and generating a discharge inhibit signal. The marker further includes means for inhibiting discharge, but permitting charge of, the battery until the battery output voltage again reaches a safe level. The advantage of this feature is that it ensures longevity of the marker unit by preventing deep discharge of the battery, which can have adverse effects ranging from polarity reversal, to simple, general degradation of the overall battery capacity.

In another aspect of this invention, a method of preparing for and activating a solar-powered road marker is provided. In this aspect of the invention, a protective, peelable label for blocking light is placed over the road marker light detector during, or immediately after, manufacture but prior to field deployment. After field deployment, the label is removed, which permits the light detector to sense light and generate an internal signal to initiate activation of the unit. This initialization is confirmed to the installer of the unit through a power-up sequence of the LED lamps. This non-contact technique is superior to conventional, mechanical switch techniques, which suffer from reliability problems.

In another aspect of this invention, a networkable road marker connectable to a networking media is provided. This solar-powered type of road marker includes means connectable to the networking media for detecting a unique, predetermined address broadcast over the media, and responding thereto by executing a command associated with the broadcast address. This feature permits each marker to be uniquely identifiable and that can be controlled (individually) from a central computer located in an area remote from the installed road marker, and may be profitably employed in areas such as airports.

In still another aspect of this invention, a solar-powered road marker is provided that includes the ability to distinguish between artificial and natural light, thus enabling its use in areas that receive commercially powered night lighting, such as airports, major highways, municipal roadways, and parking lots. Conventional road markers with active illumination are unable to so distinguish such different kinds of lights; accordingly, they remain off under artificial light when they should be on. Such a marker includes, in addition to a housing, light emitting means, a battery, and a solar collector, means for measuring the electrical current output by the solar collector, and means for determining when such current exceeds a predetermined level. A natural light indicative signal is generated when the current is greater than the trip point. An artificial light indicative signal is generated when the measured current falls below the predetermined level. The control means of the road marker is coupled to receive these signals and varies the operation of the road marker accordingly. The advantage is that the road marker will operate during nighttime hours under artificial light.

In yet another feature of this invention, a road marker is provided that includes the ability for remote, non-contact reprogramming of the central processor to allow maintenance personnel to reprogram and/or upgrade existing installed units to incorporate new or desired improvements or features. The road marker, to implement this feature, includes means for receiving a preselected data pattern indicative of a programming mode, and further, the central processor itself includes means responsive to the received data pattern for reprogramming the memory with an updated operating strategy received by the receiving means to thereby change the operation of the road marker. The reprogramming mode of the road marker may be password protected.

In still yet another aspect of this invention, a solar-powered road marker is provided that includes an integrated lens body/LED assembly. The lens body is substantially solid. It includes a top surface, a front sloping surface, a rear sloping surface, and an elongated channel for receiving the light emitting diode and extends from the rear sloping surface relatively inwardly towards the front sloping surface. The channel includes a terminal surface substantially parallel to the front sloping surface. The parallel surfaces realign light rays emitted from the LED whereby light rays emerging from the lens appear to originate from just below the top surface. A retro-reflective material is disposed on the rear sloping surface. This novel lens design permits the road marker to be disposed below road-grade, with the capability of emitting light rays viewable by road traffic to distances of approximately 300 feet.

Other features, objects, and advantages will become apparent to one skilled in the art from the detailed description and the accompanying drawings illustrating features by way of example, but not by way of limitation.

BRIEF DESCRIPTION OF THE DRAWINGS

The embodiments of the invention will now be described by way of example and with reference to the accompanying drawings in which:

FIG. 7 is an explanatory light path diagram;

FIG. 8A is a transverse sectional view, along lines VIII—VIII of FIG. 3 with an automobile tire traveling over the same;

FIG. 8B is an explanatory diagram showing a snowplow shoe traversing over part of the novel delineator, according to the invention;

FIG. 8C is a side elevational view of FIG. 8A showing debris removal by the vehicle tire transit over the delineator, according to the invention;

FIG. 9 is an explanatory diagram showing light reflected and absorbed at various surface interfaces of the light source illumination; solar collecting storage delineator, according to the preferred embodiment of the invention;

FIG. 10 represents a non-limiting example of a circuit flow chart for realizing the light source embodiment of the invention.

DETAILED DESCRIPTION OF THE PREFERRED EMBODIMENTS

Figure 1:
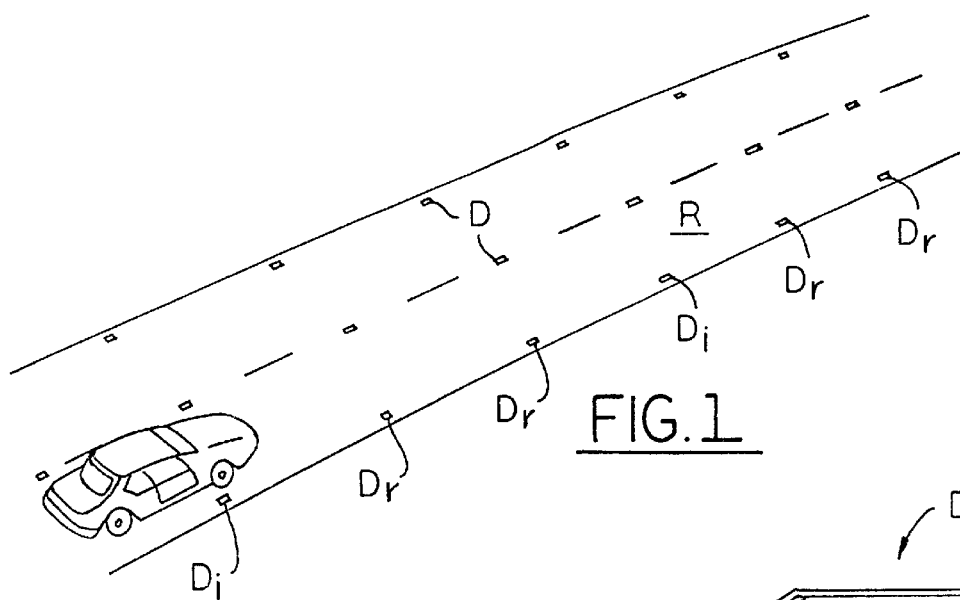
FIG. 1 is a perspective view of a roadway delineated with road markers.

Referring to FIG. 1, a roadway (R) has a plurality of delineators (D) that are placed along the boundaries of adjacent travelling lanes or, along the marginal edges of the highway so as to delineate the same. In FIG. 1, there are two types of delineators (D) indicated, a subterranean retro-reflective delineator, designated ($D_r$) and a subterranean light illuminating (light source) delineator, indicated by ($D_l$), the light retro-reflective delineators ($D_r$) being interspaced between light illuminating delineators ($D_l$) so as to reduce the effective cost of delineating the roadway since the retro-reflective delineators (Dr) are cheaper by a factor of approximately three to those of illuminating delineators ($D_l$), according to the invention. In FIG. 1, only two retro-reflective delineators ($D_r$) are indicated between each light illuminating delineator ($D_l$) but the delineators themselves are generally spaced apart about fifty to eighty feet and in reality, there would be approximately three to six retro-reflective delineators ($D_r$) between each of light illuminating delineators ($D_l$), for a roadway. They could be used as well for airports as in taxi-strips and other appropriate locations.

Figure 2:
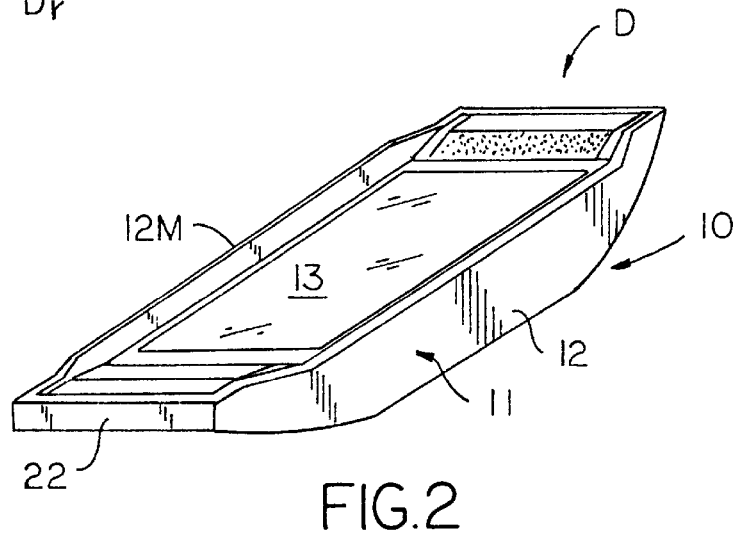
FIG. 2 is a perspective view of the delineator, according to the invention.

Referring to FIG. 2, a road delineator or marker, according to the invention, is illustrated generally as (10) and consists of an elongated zinc or an aluminum zinc alloy cast housing (11) extending along a longitudinal axis between first and second ends and having longitudinal opposing side walls (12) (with upper margins 12M) which define a rectangular, central recess (13) whose upper surface is, in the preferred embodiment of the light illuminating or light source delineator ($D_f$), a sheet of acrylic, or LEXAN® polycarbonate with an UV mar-resistant silica, i.e., polysilicate, upper surface that has an abrasion resistance close to that of glass so as to inhibit tire scuffing; or, other light transparent sheet (15) that acts as an upper vapor baffle or shield for the internal components of the delineator and over covers a similarly shaped rectangular solar collector (14). The bottom of the solar collector (14) rests within a rectangular recess or floor (16) of the cast housing (11) and is more clearly seen in the cross-section FIGS. 4A through 4C. Along the longitudinal central axis of the floor (16), there are apertures, a central aperture (AS) for allowing electrical connector wires (S1) from a light sensor (S) to pass therethrough, intermediate apertures (AC), allowing solar collector (14) electrical wires (14') to pass therethrough and, as may be required, end apertures (AV) to allow light emitting diode conductors (26) to pass therethrough, all this will be explained hereafter.

The recess (13) has a floor (16) that, at opposite ends, steps upward into a step or inclined end walls (17) with recessed vertical side walls (12) that outwardly flare as side wall portion (12'). The end walls (17) extend, thence, laterally (the right side of FIG. 4A) either as a transitional inclined bend (18) sloping upward and endward to the end (20) thereby to step downward as a housing end tag (21'); or, (left side of FIG. 4A), as a straight lateral piece (19) and thence, into an inclined lens holding tag (19') of the recess to define, between the tag (19') and the housing end tag (22'), a space or plenum into which sits a light emitting module (25). The light transparent sheet or LEXAN® (15) is sealed to the side walls (12) and the end walls (17) by an epoxy (not clearly shown) or other sealant to seal the solar collector (14) from the elements.

Figure 6A:
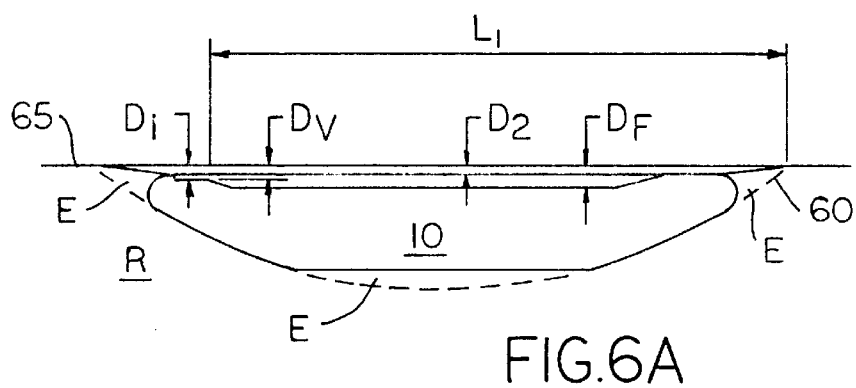
FIG. 6A is a diagrammatic section along lines similar to that of VIII—VIII, showing the various elevational features of the invention.
Figure 6B:
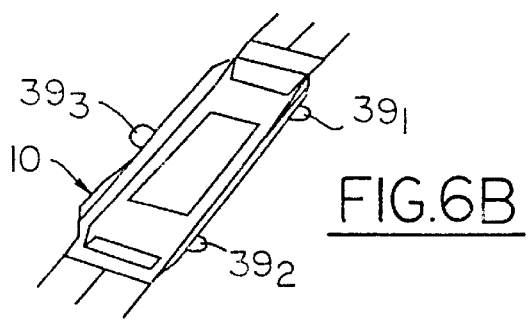
FIG. 6B is a simplified, partial perspective view of the inventive road marker, showing means, such as a plurality of tabs, for installing the road marker slightly below the surface of the roadway.
Figure 6C:
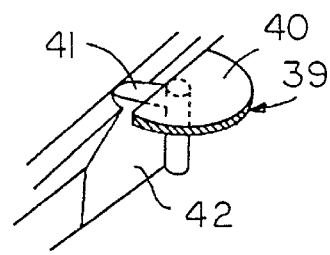
FIG. 6C is a partial, simplified, enlarged, perspective view of one of the tabs shown in FIG. 6B.
Figure 6D:
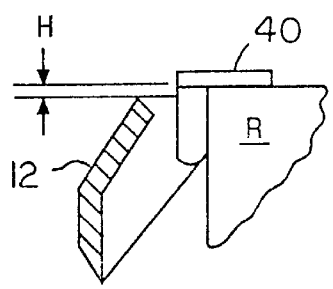
FIG. 6D is a simplified, partial, enlarged, broken-away side view of the inventive road marker, as installed, using the tabs shown in FIG. 6C, particularly illustrating how the road marker is installed slightly below the grade of the road.
Figure 6E:
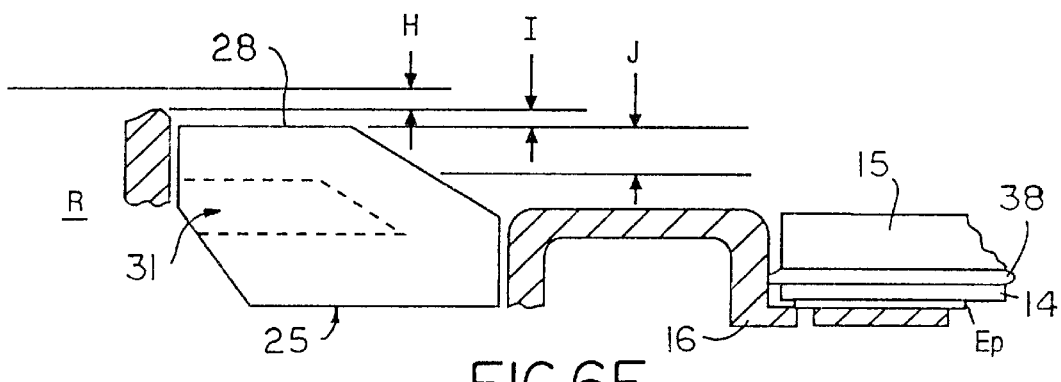
FIG. 6E is a simplified, enlarged, cross-sectional view, corresponding to FIG. 4A, showing particularly the relative elevations of several mechanical features of the inventive road marker, and, further illustrating in greater detail a shock-resistant multi-layer structure employed to protect the solar collector.

Referring now to FIG. 6E, particularly the right-hand portion of FIG. 6E, an improved shock-resistant structure is illustrated. Particularly, solar collector (14) is rigidly back mounted to floor (16) of housing (11) with epoxy, indicated generally at $E_p$. A layer of resilient light transmissive material, such as silicone (38), is disposed on and substantially overlays solar collector (14). Transparent sheet (15) overlays silicone layer (38) and provides mechanical protection for solar cell (14), while permitting light rays to pass therethrough. Housing 11 (particularly floor (16)), solar collector (14) (as rigidly back mounted with Epoxy), silicone layer (38), and transparent sheet (15) define a shock-resistant structure or sandwich. In this aspect of the present invention, the improved shock-resistant sandwich provides superior durability characteristics for the road marker, to the extent that transparent sheet (15) is contacted by automobile tires, or the like.

Figure 3:
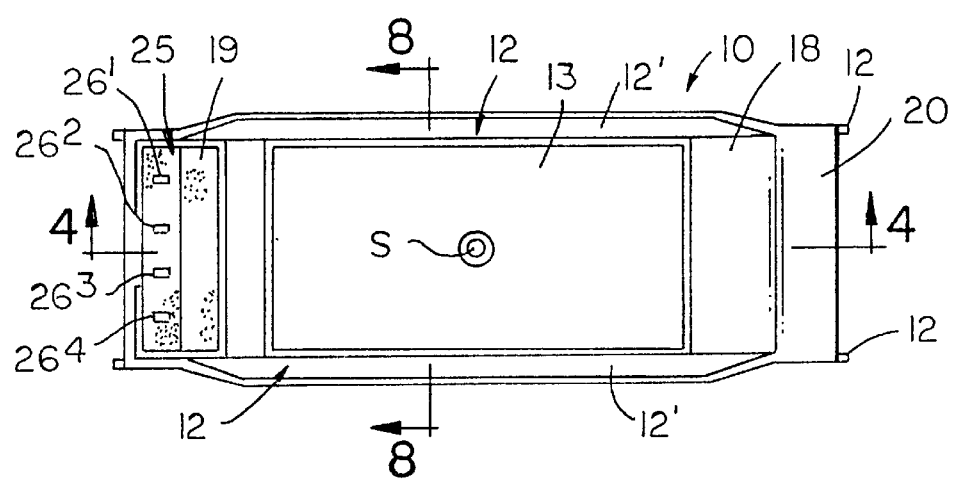
FIG. 3 is a top plan view of a delineator of the present invention.
Figure 4A:
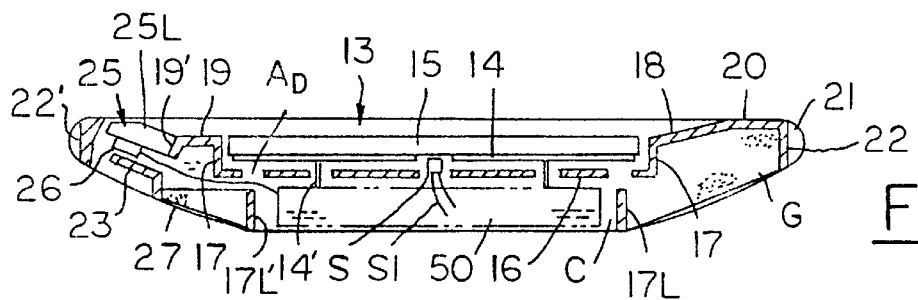
FIG. 4A is a section along lines IV—IV of FIG. 3 illustrating a light dispersing region, particularly a source light illuminating member at one end.
Figure 4B:
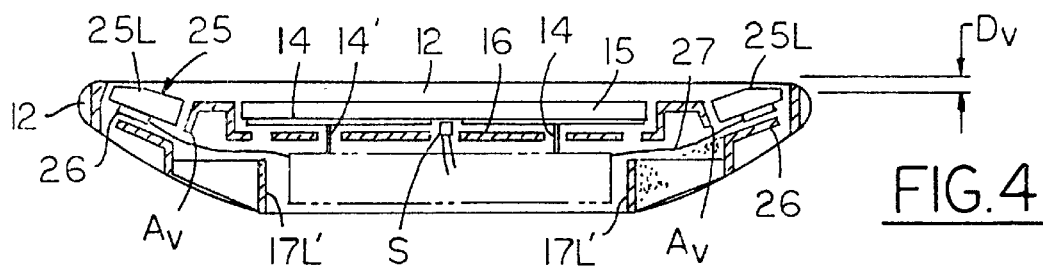
FIG. 4B is a similar section to that of FIG. 4A but with illuminating members at both ends.

Comparing FIG. 3 with that of FIGS. 4A, supporting the solar collector (14) and upon which it rests, is a rectangular cast floor (16), integrally a part of the cast housing (11). As clearly seen in the cross-section FIG. 4A, the bottom of the housing (11) beneath the floor (16), has lower end tags (17L) at the right of FIG. 4A and (17L') to the left. Between these end walls (17L'), (17L), and at the underside of the floor (16), there is defined a cavity referenced (C) into which the electrical circuitry of the preferred embodiment is placed; this circuitry being referenced (50); a circuit diagram thereof appears in FIG. 10. The circuitry (50) is mounted on an etched board and using epoxy or resin which is waterproof as well, the circuitry (50) is cemented and potted into cavity (C) so as to obtain a water-tight seal for the electrical components. In the embodiment of FIG. 4A there is only one light source emitting module (25), to the left; in FIG. 4B, there are two such light source emitting modules (25), one at either end, and each end of the casting is the mirror of the other with an aperture defined between the upper end of each end wall (17L') and aperture (AD) to allow for electrical wires (27) from the light source emitting module (25) to be passed into the cavity (C) and to be electrically connected to the control circuit (50). Similarly, the sensor (S) has its electrical wire (S1) passing through the central floor aperture (AS) to the circuit (50); and, similarly, the collector (14) has its electrical wires (14') passing through the floor apertures (AC) to the electric circuit (50). The same cast (11), as shown in the FIGS. 4A through 4C, may be used for, in FIG. 4A, a light emitting module (25), which contains a light source only at one end; FIG. 4B with light source emitting modules (25) at both ends; and in FIG. 4C with no light emitting modules in either end but rather light retroreflective lenses or modules (225) being high quality reflective arrangements like those of STIMSONITE lenses or, as otherwise commonly found in the prior art; or, utilizing a light retro-reflective adhesive tape known as 3M Diamond Grade, available from the 3M company of Minneapolis, Minn., U.S.A. or, at London, Canada.

That lower cavity bounded by the lower end wall (17L'), recessed vertical end wall (17), lateral straight segment (19) and tag (19'), as well as the underside of the light emitting module (25) is filled in with an insulating electrical epoxy that is waterproof to not only hold the module (25) in place but to seal the same electrically, from the elements.

Figure 4C:
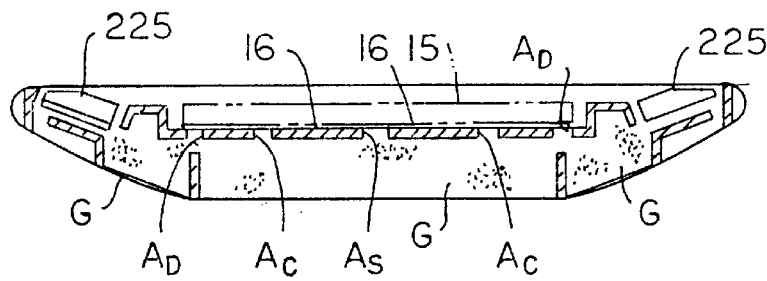
FIG. 4C is the same section but with passive light retro-reflective media at opposite ends.

Referring to FIG. 4C, where retro-reflective lens (225) are used at both ends, the total underside for all cavities of the housing (12) may be filled with a grouting material, generally indicated as (G), which is extremely cheap, relative to the use of epoxy. Further, sheet (15), which is shown in phantom in this figure, need not be used if costs are to be reduced. However, the recess (13) has a depth of approximately ⅜ of an inch and will tend to accumulate water or debris like sand which is not to be preferred; thus, for this embodiment it is preferred that sheet (15), shown in phantom, should be used to reduce the effective depth of recess (13).

Figure 4D:
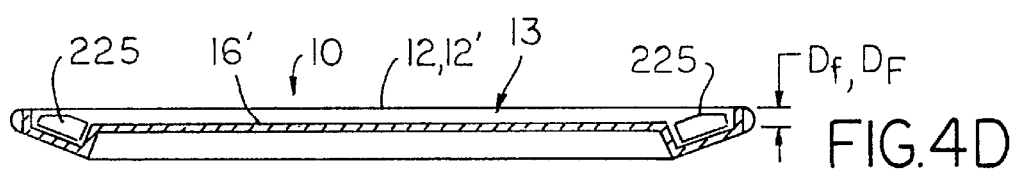
FIG. 4D is a longitudinal section of an alternative embodiment of a passive retro-reflective subterranean road marker, according to the invention, the same being very shallow in depth.

In the embodiment illustrated in FIG. 4D, the floor is an elevated floor (16') and the lower cavities of the housing are eliminated, thus, eliminating the need for housing grout material (G), thus reducing not only the casting costs but the epoxy cost. In FIG. 4D, the floor is shown as (16') and a visual comparison between that and the other FIGS. 4A through 4C, inclusive, show the floor (16) of the recess (13) is much deeper ($D_f$) than that ($D_f$) of the floor (16') of FIG. 4D.

The depth of the recess (13) is compared in FIG. 6. Comparing, internally, FIGS. 4C, 4D, and FIG. 6A together for a moment, with FIGS. 4B and 4A, the difference between FIG. 4C and those of FIGS. 4A, 4B, is that the depth of the recess (13) is identical in all of FIGS. 4A through 4C inclusive and shallower in FIG. 4D; but in FIG. 4C, not only is the sensor (S) and the solar collector (14) eliminated but so is transparent sheet (15). This tends to make the depth of the recess of FIG. 4C inordinately deeper and water pooling occurs, as well as debris collection that cannot be efficiently cleansed out by tire action, as will be described hereafter. It is thus preferred that transparent sheet (15), shown in phantom in FIG. 4C, be left in and sealed.

In the thin-profile double light retro-reflective road delineator of FIG. 4D, the floor (16') is the dimension (DF) and (D$_f$) and is shown in FIG. 6 and corresponds to the floor of FIG. 4C when sheet (15) is not used but corresponds to the upper surface of sheet (15) in FIGS. 4A and 4B being the plenum bottom (D$_f$) of the recess (13), also sometimes referred to as the upper surface of the floor but throughout, is given the dimension (D$_f$) vis-a-vis the physical bottom of the floor (DF). The dimension (D$_v$) should not exceed 1/8th of an inch; thus, as shown in FIG. 4D, that the recess floor is elevated to the position of (16') so that in either case, the dimension (D$_f$), from road grade to either the top of sheet (15) or the elevated floor (16'), and as noted in FIG. 6, should not exceed 3/8th of an inch. With these dimensions, very little, if any debris or water pooling will occur. Thus, with reference to FIG. 4D, the dimension (D$_f$) has been effectively reduced by the thickness of the LEXAN® lens (15), not only eliminating the cost of sheet (15) but also reducing and making shallower the recess (13) as well as the total thickness of the road marker (10). As will be noted hereafter, it is the transit of the automobile tires illustratively shown in FIG. 8 that removes debris from the floor (16), (16') cleansing it, and if the debris is water, reducing the water coverage over the light emitting member (25) or the retro-reflective lens (225).

Figure 4E:
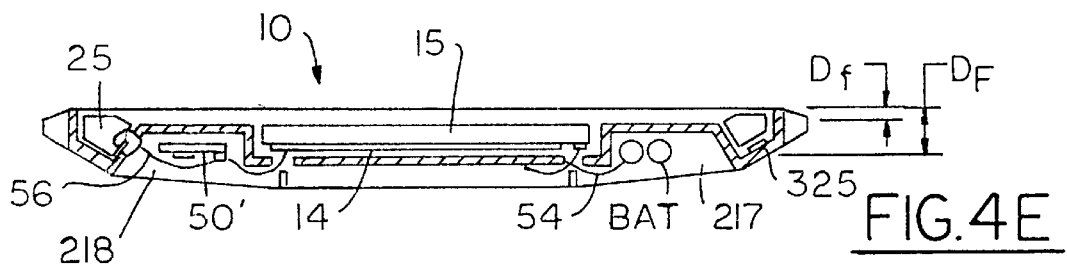
FIG. 4E is a longitudinal section of yet another embodiment wherein one end has a light source.

Referring now to FIG. 4E, and an additional embodiment of the invention is shown, but for clarity purposes, all grouting and caulking is not shown. The delineator (10) could have a retro-reflective sloped end (325) which could have been covered as well by 3M Diamond Grade light retro-reflective tape, with a light emitting module (25) at the opposite end. The plenum below the retro-reflective tape (325) defines a lower end plenum (217) in which the NiCad battery pack (BAT), or other suitable packs such as lithium ion, is located, with the balance of the electrical circuitry (50) in a lower plenum (218) at the opposite end. Wires (54) connect between the battery (BAT) and the balance of the circuitry; also to the light emitting module (25) as wires (56) and to the light sensor (S) at the opposite end, as shown passing through appropriate housing apertures (not referenced) but in a fashion as earlier described. Sheet (15) over covers the solar collector (14) and is sealed, not shown, in a fashion as earlier described. It should be appreciated that in each one of the embodiments, the upper margins of the side walls (12) are at an elevation above that of an upper surface of the light dispensing module (25), and, as well, as that of the central recess (13)—whether it be an upper surface of transparent sheet (15), or floor (16). The main point here is that the upper margins provide mechanical protection for the light module (25) and for the central recess, which is particularly important in those embodiments with a solar collector. Hence, an oscillating snowplow blade will hit the upper margins, NOT the transparent sheet (15) under which solar collector (14) is disposed. This feature significantly improves the durability of marker (10).

Figure 4F:
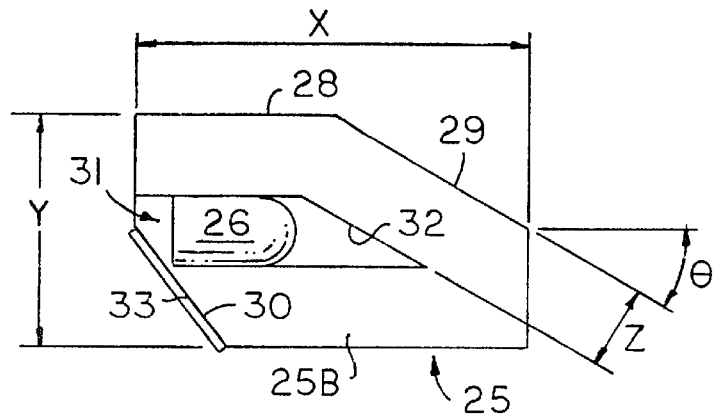
FIG. 4F is a partial, simplified, enlarged section view of a lens/light emitting diode assembly used in an embodiment of the present invention.

FIG. 4F shows an enlarged light emitting lens assembly (25), which includes a lens body (25B), and a light emitting diode (26). The lens is substantially solid, and includes a top surface (28), a front sloping surface (29), a rear sloping surface (30), an elongated channel (31) extending from rear sloping surface (30) relatively inwardly toward front surface (29) for receiving light emitting diode (26), channel (31) having a terminal surface (32) substantially parallel to front sloping surface (29), and retro-reflective material (33) being disposed on rear sloping surface (30).

In the illustrative embodiment, the dimensions X, Y, and Z, assume the values of one inch, 5/8ths of an inch, and 0.200 inches, respectively. It should be appreciated, however, that, in accordance with the present invention, many different physical configurations remain within the spirit and scope thereof. The lens body is made from material having an index of refraction between about 1.4 and 1.52, which may be acrylic. Since channel (31) encloses air, having an index of refraction of 1, the angle θ, as shown in FIG. 4F, is approximately 30 degrees. When used in the preferred embodiment, such a configuration provides emitted light rays visible at a distance on the roadway of approximately 300 feet. Retro-reflective material (33) may be reflective tape, as described above (e.g., such as is available from 3M). The configuration shown in FIG. 4F, particularly parallel surfaces (29), and (32), are effective in realigning light rays emitted by light emitting diode (26) whereby light rays emerging from lens body (25) appear to originate from just below top surface (28).

Figure 4G:
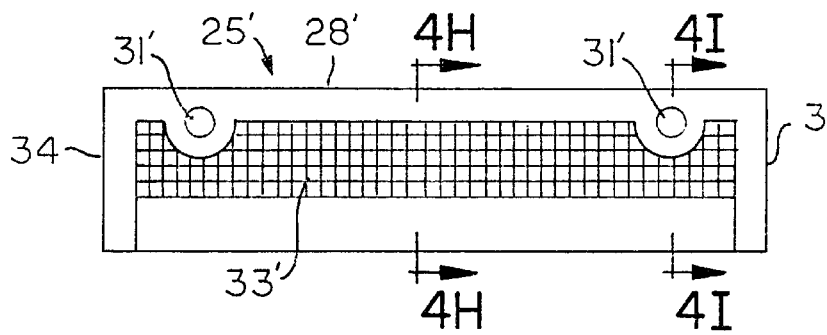
FIG. 4G is a simplified, enlarged, partial rear view of another embodiment of a lens/light emitting diode assembly in accordance with the present invention.

Referring now to FIG. 4G, an alternate light emitting lens module or (25') is illustrated, in a rear view. Light emitting lens (25') includes top surface (28'), a pair of channels (31') for receiving respective light emitting diodes (26), retro-reflective material, such as silver or foil (33'), and laterally disposed support legs (34).

Figure 4H:
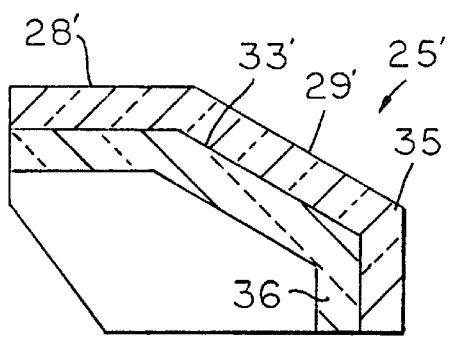
FIG. 4H is a simplified, partial, enlarged, section view taken substantially along lines 4H—4H of FIG. 4G showing the two-shot structure of the lens, and the embedded retro-reflective material.
Figure 4I:
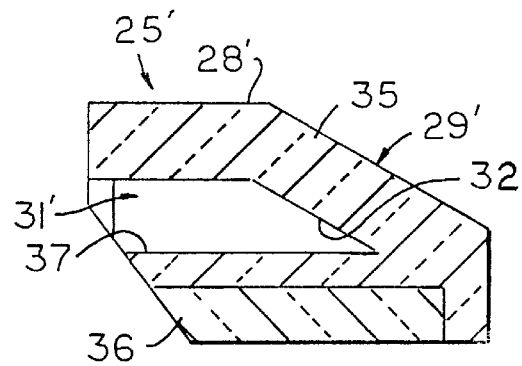
FIG. 4I is a partial, simplified, enlarged cross-section view taken substantially along lines 4I—4I of FIG. 4G, showing the two-shot structure of the lens, and particularly showing the channel for receiving the light emitting diode.

FIG. 4H reveals information regarding the manufacture of light emitting lens (25'). In particular, the area designated (35) is obtained as a result of a first "shot" of material in a mold; the area designated at (36) represents a second "shot" of material in a mold. FIG. 4I employs the same convention. Light emitting lens (25') embeds retro-reflective material (33') between "shots" as shown in FIG. 4H. Another feature of light emitting lens (25') includes bump (37), which is used to facilitate ultrasonic welding of light emitting diode (26) into the lens body. Lens (25'), however, retains the channel (31'), having terminal surface (32'), feature found in lens (25). This important aspect unifies the two designs, and provides the above-described advantage of realigning light rays to emerge so as to be seen at a distance of approximately 300 feet down a roadway, or the like.

FIG. 6E shows how light emitting lens (25) is installed in road marker (10). As installed, road marker (10) is preferably a distance (H) beneath the roadway (R) surface. Distance (H) is preferably approximately 1/16th of an inch. Lens (25), as installed, is approximately a distance (I) below the upper housing perimeter. I is approximately 1/8" in the preferred embodiment lens (25) further provides an additional dimension (J) (i.e., the distance or thickness of lens (25) between top surface (28) and channel (31) where diode (26) is housed—which is approximately 0.2" in the preferred embodiment). Overall, the upper portion of the boundary walls of the unit are configured, therefore, to permit at least a nominal 1/8th of an inch deterioration as the road traffic surface erodes. An additional 0.2" of wear is permitted before unit failure. This feature extends the life of road marker (10) substantially.

It should be appreciated that since the road marker is preferably below grade, and, particularly, the light source (26) is substantially below grade, that a problem arises as to projecting light rays adequately visible a reasonable distance down a roadway or the like. Lenses (25 and 25') solve this problem, by the above-described configuration wherein parallel surfaces refract and realign the light rays to emerge above-grade, visible to motorists at an adequate distance.

As referenced in FIG. 6A, the delineator (10) of the different configurations, as shown in FIG. 4, is actually embedded into the road (R) by cutting away, with a circular saw or the like, an arcuate recess (60) into the upper smooth asphalt surface. The delineator (10) shown is really that of FIGS. 3 and 4A through 4C but has application as well to those of FIGS. 4D and 4E, the only difference of course being the depth of arcuate cut (60) and the profile of the delineator (10). Particular advantage for the shallow delineator of FIGS. 4D and 4E allows the use of plunge and drag cutting which is an easier cut. It has another advantage of not penetrating into the second layer of asphalt which is the more granular layer, the top layer being the thin smooth asphalt finish. An asphalt grade epoxy (E) is used to cement the subterranean marker (10) into the surface of the roadway (R) so that the upper margin of the sides (12, 12') thereof is either flush or preferably about a ¹⁄₁₆ inch below the surface grade of the road (R) asphalt. This latter penetration into the asphalt allows for slight degradation or destruction of the upper surface of the road (R) so that the delineator (10) stays sub-terranean during the full actual service life of the road.

Referring now to FIG. 6B, inventive road marker (10) is shown, as installed with the aide of alignment tabs (39₁), (39₂), and (39₃). These tabs are provided to ensure proper depth placement of unit (10). As shown in FIG. 6C, tab (39) includes a planar stop portion (40), a laterally extending neck portion (41), and a retainer portion (42). As shown in FIG. 6D, tab (39), by way of stop (40), ensures that the upper margin of side wall (12) is approximately a distance (H) below the roadway surface. Consistent installation, by the above-described means, is thereby established.

Figure 5:
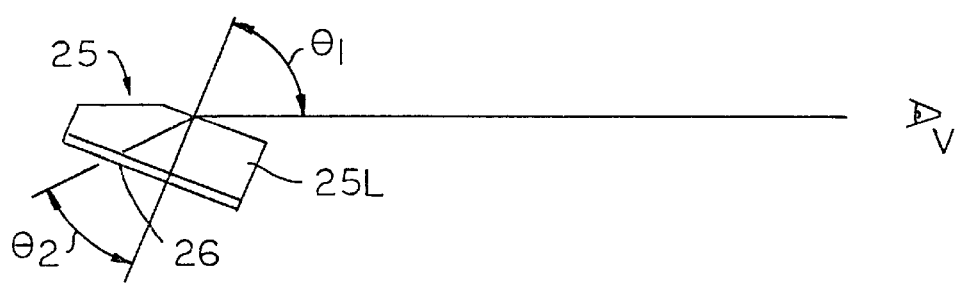
FIG. 5 is an explanatory diagram showing light path emission from the light source of the invention.

FIGS. 5 and 7 are co-ordinate light diagrams to indicate the effective operation of the subterranean road delineator, according to the invention irrespective whether it uses a retro-reflective lens (225) or a light emitting lens (25). Referring to FIG. 5, the eye reference (V) is presumed to be that of a driver of an oncoming vehicle approaching the delineator (10) which utilizes a source light (26), preferably a light emitting diode with an over covering lens (25L). The light source (26) emits light and will be reflected along the light path toward the eye (V) according to the standard equation of $n_1 \sin \theta_1 = n_2 \sin \theta_2$ wherein $n_1$ is the angle of refraction for air generally 1.0, and for $n_2$, that of the lens (25L) which for a plastic material approaches about 1.5. Light emanates from the light source or diode (26) follows this path and because of the appropriate inclination of the module (25), the module (25) may be placed below grade, out of harm's way. This is more clearly understood with reference to FIG. 7, wherein the same is a light-point diagram where, at the source, we have a light (26) which is reflected through its lens (25L); the bed length of the delineator in FIGS. 6A and 7 is indicated as distance $L_1$ while the distance between the driver at point (V) from the light source (26, 25) is the distance Lv, i.e., the distance from the delineator (10) to a driver at point (V) and his elevation above the surface of road is dimensioned $(H_v)$ which, depending upon the vehicle, truck, wagon or automobile, will vary. The distance $(D_v)$ is common with that between FIGS. 6A and 7 which is the elevation below grade of the light emitting media (25), or the light retro-reflective media (225). Judicious selection of the angle of the lens respectively, (25L) and (225L) and of the dimension $(L_1)$ for the length of the delineator, actually length of the recess (13), will determine the overall distance—dimension (LV) —of visible light seen by the eye (V).

Referring to FIGS. 8A and 8B which is a comparative section along lines VIII—VIII of FIG. 3, it will be seen that the delineator (10) has vertical side wall segments (12) and upper upwardly flaring side walls (12'), preferably at about 45° which meet the vertical side wall segments (12) at the upper elevation of the lens (15). Thus, the void of the recess (13) has outwardly flaring sides and this assists in debris removal.

Referring to FIG. 8C, a tire (80) is shown in side elevational view rolling to the left; as a result of the circular rotation according to the arrow on tire (80), it ejects to the rear, debris (85) which cleans off the marginal upper edges (12') of the sides of the delineator as well as any debris on the upper surfaces of the recess (13) whether the same be the lens (15) upper surface, or the floor (16, 16'). In FIG. 8A, one sees a typical lateral cross-sectional of the road marker (10), according to the invention, the tire (80) not actually making contact at all. Because of the rapidity of travel and short transit time of the tire (80) over the delineator (10), even though there is no actual tire contact with the lens (15) or the floor (16), (16'), as the case might be, debris is flushed away.

In the cross-section FIG. 8A, one sees a tire (80), and in the cross-section of FIG. 8B, a snowplow shoe (90) is shown having a width (91) which is approximately generally 12" for highway snowplows, while the actual width (W) of the delineator (10) between vertical side walls (12) is approximately 4" and at margins of the side walls flares 4.5". The dimension (92), shown in FIG. 8B, is thus approximately 9" when a 1' width snowplow shoe (90) is used so that the snowplow shoe actually runs on the road surface (R) and does not contact the delineator (10) at all. In FIG. 8A, the tire (80) is shown which makes an imperfect contact or no contact at all to the lens (15). Such delineator (10) dimensions insure good survival for the delineator (10).

FIG. 9 is a light diagram illustrating light penetration through a snow and water covering of the embodiments of FIGS. 2, 3, 4A, 4B and 4E, wherein the following are the relevant references; (14) being the solar collector, (15) being the over covering lens therefore, protecting it from the elements, (60) being snow over covering the delineator recess (13) between road grade and the upper surface of the lens (15) $(D_f)$. Direct sunlight is shown by reference (70) and ambient and reflected light by arrow (72). For the purposes of discussion, direct sunlight (70) will strike the snow (60) by the family of rays (71) and will be correspondingly reflected, in part, away from the surface of the snow (60) by rays, only one being illustrated; namely, that of (73). The rays (71) penetrating into the snow (60), are referenced (75) and those that pass the boundary between snow (60) and the lens (15) are shown as (77). At each of the boundary conditions there will be some reflected away from the boundary and these rays, as it relates to the snow-lens interface (60,15) are referenced (76) and for the lens-solar collector interface (15,14) (78) and for the intervening interface between lens (15) and snow (65) as (79). These rays fall and are reflected or are absorbed, according to the laws of light refraction. It has been calculated that when LEXAN® is used, then of the visible ambient light and direct sunlight available from rays (70) and (72), to strike the solar collector (14) for conversion into electricity is in excess of 80%, and when snow (60) over the lens (15), somewhat greater than 20% of the solar energy is converted into electricity via charging the battery (BAT).

Referring to FIG. 10 a non-limiting representation of satisfactory electronic circuitry (50) as depicted, the same consists of a single chip micro controller (CPU), a resistive light sensor (S) connected to input terminal (DO) on the controller (CPU) with the opposite side of the sensor (S) being connected to ground via a capacitor (CAP). The solar collector (14) may be a photovoltaic cell. The collector (14) is connected in series with a charge controller (CC) consisting of, but not limited to, a Schottky diode (D1) and both of these are connected in parallel with the photo voltaic array, solar collector (14). Power for the controller (CPU) is provided from the positive and negative terminals of collector (14). High intensity gallium arsenide light emitting diodes (LED, 26) are connected to the output lines (D1) and (D2) of the controller (CPU). A series resistor (R) is connected from the output line of the (CPU) to the anode of the LED (26) with the cathode being connected to the positive buss of the circuit (50). Simplistically, the sensor (S) provides the controller (CPU) with a signal representative of the ambient light level. Dependent on the intensity of the light over a computed period of time, the controller (CPU) triggers the output lines (D1) and (D2) to a low level resulting in the LED lamps (26) illuminating. The value of (R1) and (R2) determine, in part, the intensity of the LED lamps (26).

When the intensity of the ambient light level rises above a computed level, the controller (CPU) will trigger the output lines (d1) and (d2) to a high level resulting in the LED lamps (26) extinguishing.

During periods of the LED lamps (26) being extinguished, the controller (CPU) will enter a power conservation mode at which time it will wake up for a 1 second interval every 60 seconds or so, to evaluate current ambient light conditions of sensor (S). During periods of daylight illumination, the photovoltaic array, solar collector (14), will automatically recharge the battery pack (BAT) to a preset level and then terminate the charging cycle. The charge controller (CC) will prevent discharge of the battery (BAT) pack through the photovoltaic array, solar collector (14), during periods of low ambient light.

Figure 12:
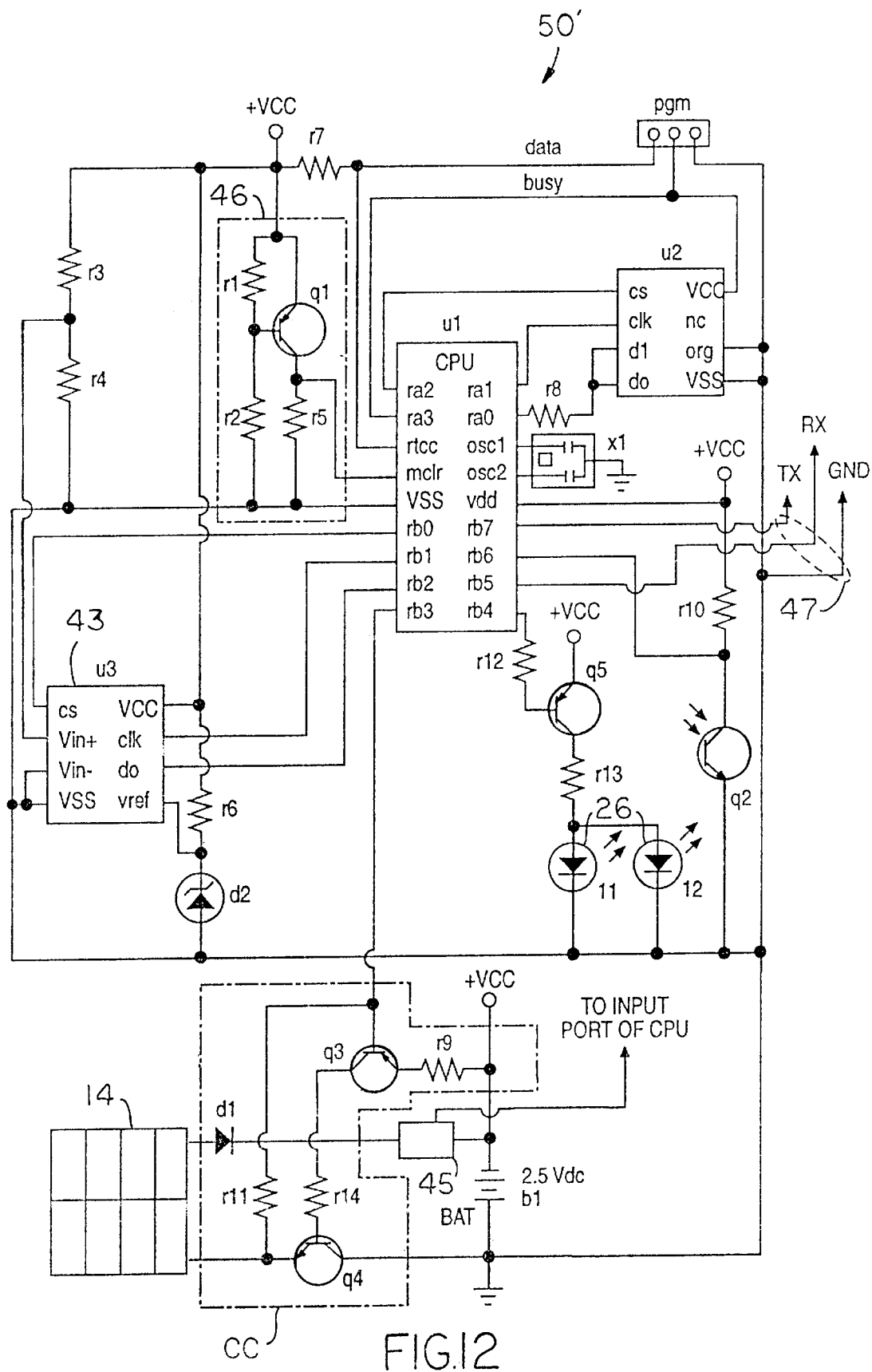
FIG. 12 is a partial, simplified, schematic and block diagram view of another embodiment of a logic diagram used for controlling the operation of the inventive road marker.

Referring now to FIG. 12, another embodiment of electronic circuitry (50) is shown as circuit (50'). Circuit (50) includes control means, such as indicated at CPU, for controlling the operation of road marker (10), light emitting means, such as LEDs (26), for providing illumination, a battery, such as rechargeable NiCAD battery (BAT) for powering LEDs (26), a solar collector, such as photovoltaic cell (14), for converting solar energy to electrical energy, analog-to-digital converter means, such as A/D converter (43), for converting an analog input into a digital representation of said input and providing such digital representation as an output, non-volatile memory means, such as EEPROM memory device (44), for storing a predetermined strategy for operating road marker (10), measuring means, such as current sensor (45), for generating a current signal indicative of the level of electrical current passing therethrough, a shutdown circuit (46) for determining when the battery voltage has fallen below a preset safe level, and generating a signal to halt control means CPU, and charge controller (CC) for selectively permitting charging of battery (BAT) during daylight hours.

Control means CPU may be a single-chip microcontroller, such as commercially available component PIC 16C54-RC/P from Arizona Microchip Company. It should be appreciated, however, that there exists many different alternatives to this particular chip employed in the preferred embodiment, and, that such substitutions and variations remain within the spirit and scope of the present invention. For example, any of the family 16CXX has been found satisfactory for this invention. CPU may include on-chip nonvolatile memory, random access memory, and input/output ports, among other features.

Solar collector (14), in the preferred embodiment, is a commercially available photovoltaic cell component, available as part number ATS-7/7-PSM-3;6/213 from Atlantic Solar Products, Inc. of Baltimore, Md. In this connection, it should be appreciated that there are a wide variety of alternatives and substitutions that remain within the spirit and scope of the present invention. Solar collector 14 provides an open circuit voltage, $V_{oc}$, of approximately 4.8 volts, is characterized by a short-circuit current, $I_{SC}$ of 227 mA, and provides a power tolerance of approximately ±10%. A solar collector having the above-described characteristics has been found satisfactory in constructing an embodiment in accordance with the present invention. In the preferred embodiment, chargeable battery BAT is a nickel-cadmium battery, which is a commercially available component Sanyo Model #KR-1400, available from Atlantic Solar Products, Inc. of Baltimore, Md.

A/D converter (43), in the preferred embodiment, is an eight-bit digital converter wherein the eight-bit digital word output is provided serially on the data output DO terminal of device (43). A/D converter (43) uses, as its voltage reference, a precision voltage reference D2, which, in the preferred embodiment, regulates the voltage at its cathode to approximately 1.234 volts. Device (43), and reference D2 are widely available.

Memory (44) is a commercially available component, which, in the preferred embodiment, may take the form of model 93LC56, from Arizona Microchip. Memory (44) is an electrically-erasable programmable read-only memory ($E^2$PROM). Device (44) performs conventional functions well-known in the art.

Measuring means (45) is provided for measuring the electrical current generated by solar collector (14), and internally generating a current signal indicative of a level of electrical current generated. Device (45) further includes evaluation means for determining when the current level exceeds a predetermined level and generating an output indicative of the evaluation (i.e., when the sensed current exceeds the predetermined trip point). Device (45) is a commercially available component, in which may be a Maxim MAX 471/MAX472 series precision current-sense amplifier, available from Maxim Integrated products. It should be appreciated that other products performing the same or similar functions remain within the spirit and scope of the present invention.

In particular, device 45 is used, in one embodiment of the present invention, to distinguish between artificial light and natural light. A study of this problem indicates that, when presented with artificial light, the current output of solar collector (14) drops to less than one percent (1%) of full panel current, relative to the current generated under bright, natural sunlight conditions. The device (45) can be set to toggle its output depending upon when the current therethrough is either above or below a predetermined level, which, in the preferred embodiment, may be approximately 7 mA. Thus, the output of device (45) is a natural light indicative signal, and an artificial light indicative signal, depending upon its present state. As shown in FIG. 12, the output of device (45) may be provided to an unused port on control means CPU. In this connection, in one embodiment, nonvolatile memory (44) is integrated on-chip, thus freeing up ports which may be used as an input to receive the output of device (45). The artificial light/natural light signals are incorporated into the overall control of the unit to enable the unit to be used in the areas that receive commercially powered night lighting, such as airports, major highways, municipal roadways, parking lots, and the like.

Charge Controller CC of circuit (50') function as described above in connection with circuit (50). Depending upon the output state of port RB3 of control means CPU, Charge Controller CC inhibits/enables charging of battery BAT. In particular, when the output state is high, transistors Q3, and Q4 are off, wherein charging of battery BAT is inhibited. When the output is low, charging is enabled.

LEDs (26) are included for providing illumination. When output port RB4 is low, transistor Q5 is placed in a conductive state, wherein LEDs (26) are illuminated. Alternatively, when output port RB4 of CPU is high, transistor Q5 is in a non-conductive or off state, and LEDs (26) are extinguished.

Transistor Q2, in connection with pull-up resistor R10, provide the means for detecting ambient lighted conditions. It should be understood that transistor Q2 is a phototransistor, wherein transistor Q2 becomes conductive in responsive to light.

Shutdown circuit (46) is provided for placing control means CPU in a halted or shut-down mode. When the battery output voltage, as sensed through the positive bus $V_{cc}$, falls below a predetermined level, transistor circuitry halts the CPU, Specifically, when a predetermined fraction of $V_{cc}$, as determined by a voltage divider formed by resistors R1/R2, is applied to the base of transistor Q1, Q1 is placed in a nonconductive state wherein the master clear input $\overline{MCLR}$ of the CPU is pulled to ground by way of resistor R5 thus, halting operation. In the halted state, the LEDs are not illuminated.

Figure 11:
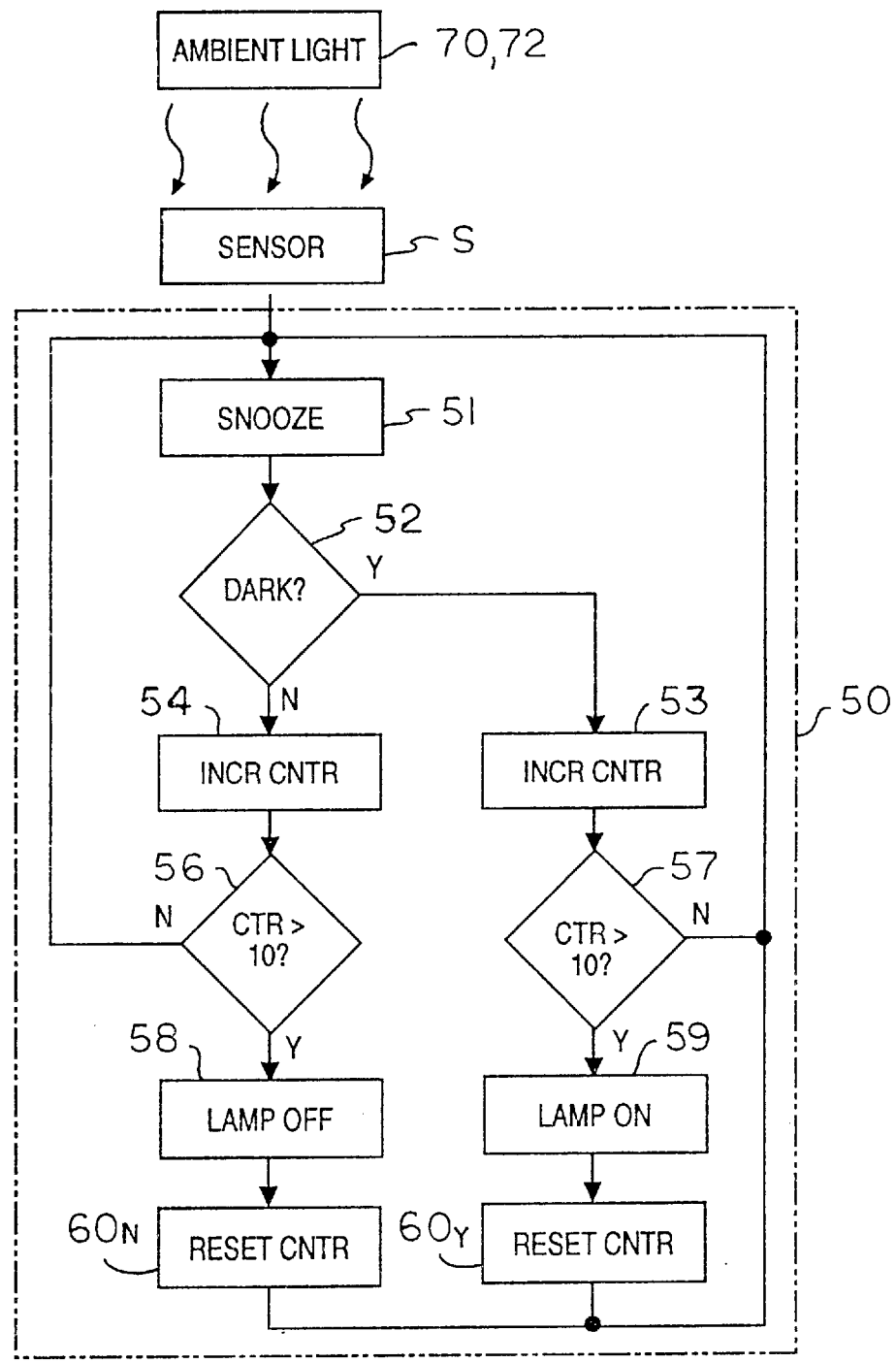
FIG. 11 is a non-limiting example of a logic diagram of how the invention may be achieved for a light emitting delineator having light source lamps to be turned on and off between night-time and day-time conditions while also allowing battery recharging during daylight, all according to the invention.

For commercially acceptable performance, the road marker must be reliable. To this end, an anti-falsing control is programmed to operate on the CPU to prevent the LEDs (26) from being turned off accidentally, for example, by car headlights. This is shown in FIG. 11. Now referring to the logic diagram of FIG. 10, at one minute intervals, the (CPU) of FIG. 10 (or FIG. 13 in the preferred embodiment) awakes from a power conservation mode (snooze 51) and evaluates the ambient light level at the sensor (S). If the light level is daylight or bright at (52) then incremental counter (54) increments for a period of 10 cycles and at counter (56), if the value is less than 10, then a signal goes out gate (N) to restart the snooze; otherwise, if the value is higher or greater than 10, the lamp or light module (25) is turned off and the counters (56) and (57) reset via step ($60_N$); if the intensity is dark, then a signal goes out gate (Y) at (52) and follows through an identical sequence, as earlier described along (53), (57), (59), and ($60_y$).

One aspect of the present invention, broadly, relates to several battery (charging and discharging) management features. One of these features relates particularly to monitoring the state of the battery charge, and inhibiting charging of the battery to prevent overcharging and possible outgassing. Overcharging severely reduces the life of nickel cadmium batteries, as well as other types of battery technology. When the control established by the marker 10 electronics detects that the battery BAT is in a fully charged state, charging will be inhibited. The state of the battery will be monitored, periodically, and charging will later be enabled in accordance with predetermined criteria.

To implement this charge inhibit feature, the battery output voltage must be measured. This is done by measuring the positive power supply bus $V_{cc}$ since, as it should be appreciated the battery voltage appears on the positive power supply bus $V_{cc}$. The voltage $V_{cc}$ is divided by a voltage divider comprised of resistor R3 and resistor R4, and is provided as an input to A/D convertor (43), which uses precision voltage referenced D2 for comparison. In the illustrative embodiment, the input to device (43) is then sampled, and digitized into an eight-bit word, and is sent, serially, from data output pin DO to input port RB2 of the control means CPU. If the digitized value of the battery output voltage is higher than a predetermined upper limit, then a charge inhibit signal is generated by CPU. Responsive to this charge inhibit signal, charge control CC, by way of Q3 and Q4, prevents current generated by solar collector (14) from charging battery BAT. This mode will continue until the charge inhibit signal is canceled by the CPU. Thus, the means for determining when the battery output voltage exceeds an upper predetermined level (i.e., the battery is in an over healthy state), and for generating a charge inhibit signal in response thereto includes device (43) and the CPU. Further, the means, responsive to the charge inhibit signal, for inhibiting charging of the battery includes charge controller CC. It should be appreciated that part of the determining means includes program steps being executed by control means CPU. Likewise, means for inhibiting charging of the battery also includes some program steps.

Another feature of the battery management control includes the capability of full-cycle discharging and recharging of the battery to minimize any potential memory effect associated with nickel chemistry batteries. This feature ensures the full rated life of the battery. In particular, to achieve this function, the above-mentioned charge inhibit signal is not canceled until the battery is discharged (i.e., by way of current consumed by LED's (26), control means CPU, and other associated circuitry) until its output voltage falls below a predetermined lower limit. Thus, to implement full cycle discharge and recharge, the battery output voltage, as it appears on the positive power supply buss $V_{cc}$, is measured by way of A/D convertor (43), as described above, and the charge inhibit signal is not turned off until a lower predetermined limited is sensed. In the preferred embodiment, the lower limit is approximately 2.0 volts (as sensed) while the upper predetermined limited is approximately 2.6 volts (as sensed).

Figure 14:
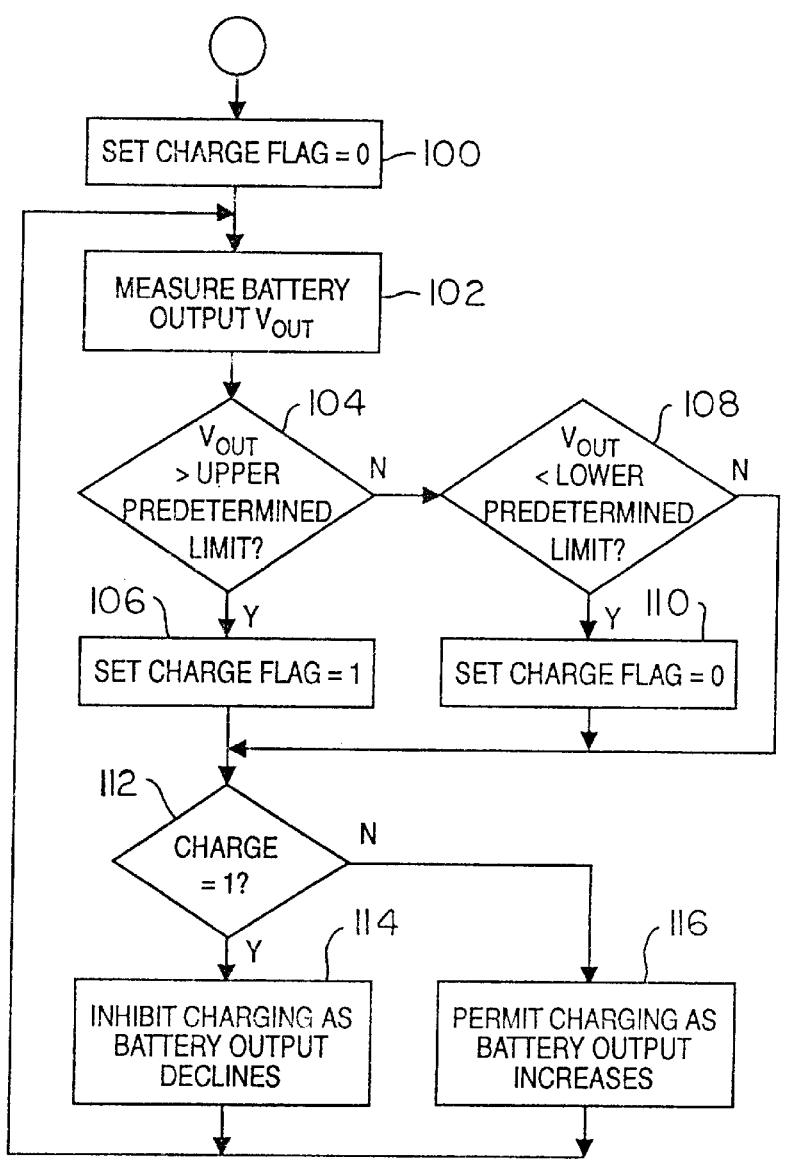
FIG. 14 is a simplified, flow-chart diagram showing a charging scheme established by the control of the road marker in accordance with the present invention.
Figure 15:
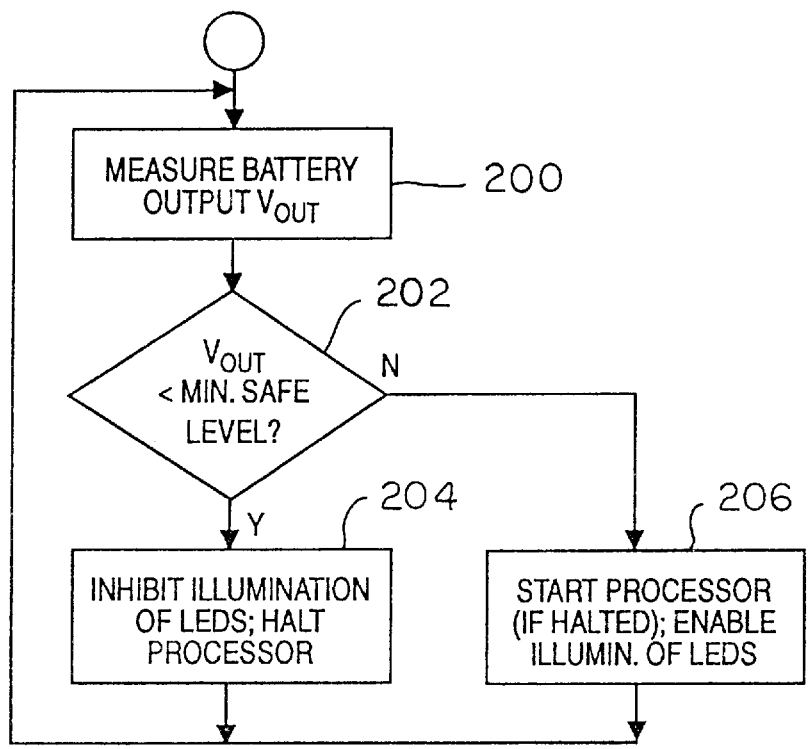
FIG. 15 is a simplified, flow-chart diagram illustrating a discharge scheme established by the control of the road marker in accordance with the present invention.

Referring now to FIG. 14, a flow chart is illustrated that depicts the control established by control means CPU by execution of preprogrammed steps to implement the charge control feature. In step 100, a charge flag is set to zero. This setting indicates that charging of the battery will be permitted by the CPU via charge controller CC. In step 102, the battery output voltage is measured by means of the structure described above.

In step 104, the measured battery output voltage is compared against an upper predetermined limit, and an evaluation is made as to whether the output voltage is greater than this upper predetermined limit. If the answer is YES, then control is transferred to step 106, wherein the charge flag is set to a one. A logic one, in this case, means that the CPU will control the charge controller CC to inhibit charging of the battery.

On the other hand, if the output of the evaluation in step 104 is NO, then control is transferred to step 108 where the measured battery output voltage is compared to a lower predetermined limit. If the answer to this comparison is NO, then the control assumes that the output battery voltage is somewhere between the upper and lower predetermined limit; accordingly, the charge flag remains unchanged, thus further allowing either charge or discharge of the battery cells. However, if the answer to the comparison with the lower limit made in step 108 is YES, then control of the procedure is transferred to step 110, wherein the charge flag is again set to zero, meaning that the charge controller CC, by way of control means CPU, will inhibit charging of the battery cells.

In any event, the procedure continues at step 112, wherein the charge flag is compared to determine whether it is a 1.

If the answer is YES, then control is transferred to step 114, wherein charging of the battery cells by way of solar collector (14) is inhibited as the battery output declines towards the lower limit. The procedure then resumes at step 102, where, after a predetermined time, the battery output voltage is again measured and the procedure repeated.

If, however, the answer to the evaluation in step 112 is NO, then control is transferred to step 116, where charging of the battery is permitted, by way of charge controller CC, in conjunction with control means CPU, while the battery output voltage increases towards the upper limit. The procedure resumes at step 102. It should be appreciated, that the flow-chart depicted in FIG. 14 may be run in parallel with many other procedures necessary for the operation of road marker 10.

In southern states, where the solar power available to solar collector (14) is relatively high, compared to northern climates, a discharged battery may be fully charged in less than a day, and sometimes in as little as five hours. Discharge of the battery, since the nighttime current draw is relatively predictable, requires approximately ten days. Under this scenario, one day of charging would be followed by ten days of discharging with recharge inhibit.

However, for example, in northern climates, with little sunlight during the winter months, little, progress is made in recharging the battery during the daylight hours, as compared to the discharge made during nighttime hours. In this situation, a time versus battery voltage graph appears to look like an slow, upwardly ascending staircase.

A third battery management feature relates to inhibiting all discharge in the event that the battery system reaches a predetermined lowest safe output voltage. To ensure the longevity of the inventive road marker (10), deep discharging of the battery must be prevented. With most battery technologies, such deep discharging can cause a polarity reversal and, degrade the overall capacity of the battery system. To provide full battery performance for the stated life, it is important to prevent deep discharge.

The means for implementing this feature include shutdown circuitry (46). This transistor circuitry, upon sensing a predetermined lowest safe battery output, will halt the processor by way of the master clear input ($\overline{MCLR}$). The control processor CPU, thus halted, will not consume any appreciable current, and further, not operate to illuminate LED's (26), which provide a significant current savings. Thus, the shutdown circuitry (46) defines means for determining when the battery output has fallen below a safe level (i.e., the battery is in an unhealthy state), and generating a discharge inhibit signal in the form of a master clear signal. The CPU is responsive to such signal and, will generally inhibit any further discharge of the battery, but, due to the particular circuit configuration depicted in FIG. 12, will permit charging of the battery until the output voltage rises above the predetermined lower safe operating level.

Figure 13:
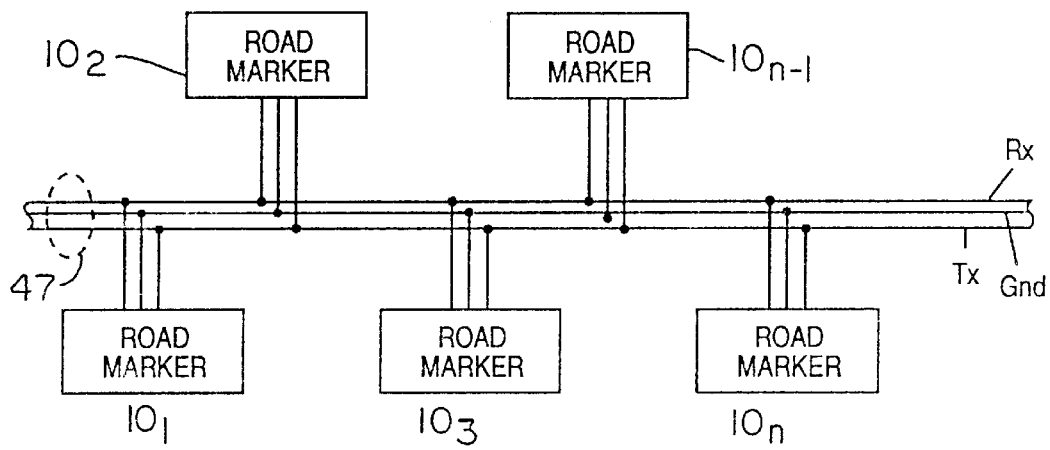
FIG. 13 is a simplified, block diagram view of a plurality of road markers being networked by way of a networking media in accordance with the present invention.

Another aspect of the present invention relates to networkability. In particular, one embodiment of the present invention provides the means for being networked with other, similarly-networked-capable road markers. Referring now to FIG. 13, a plurality of road markers $10_1$, $10_2$, $10_3$, . . . $10_{n-1}$, $10_n$ are connected to a networking media (47), which, in the preferred embodiment, is a three-wire media comprising a transmit ($T_x$) line, a receive ($R_x$) line and a ground (GND) line.

Referring now to FIG. 12, in the embodiment of the road marker employing circuitry (50'), the control means CPU includes means, connectable to media (47), for detecting a unique, predetermined addressed broadcast over the media (47) and responding thereto to said detection by executing a command associated with the broadcast address. In particular, the control means CPU includes means for configuring its input/output ports as interface leads for the well-known I²C networking technology. As shown in FIG. 12, port RB7 has been configured as a transmit line, while port RB5 has been configured as a receive line. As mentioned above, in the preferred embodiment, a PIC series 16CXX processor is used for the CPU; this type of microcontroller includes this networking technology on-board. It should be understood that variations and modifications can be made and remain within the spirit and scope of the invention. For example, other processor types may include networking technology (even other than I²C) on-board. Also, a separate interface chip for networking may be employed.

The network, so configured, is a multi-drop buss type. Each unit has a unique address. In the preferred embodiment, such address comprises a two-byte identification code, which is assigned and "burned-in" upon manufacture. This functionality provides for addressable networking between units, or between several units and a host computer. The buss link is embedded in the surface of the pavement. This communications network allows each marker to hold a unique identifier or station address that can be controlled from a central computer located in an area, such as a control tower in an airport for an airport application.

As an example, the computer can command a number of units, selected by an operator, to change the display color, begin flashing, begin sequencing (i.e., successive units being illuminated) between a number of identified units, or any other unique operation that would need to be carried out to communicate a change in situation to viewers of the road marker. The wire link may also have the capability to carry low voltage DC power to the road marker that can be used in lieu of the solar panel and battery, or in conjunction therewith, to thereby provide operation during periods of power failure or, in mission critical applications. Although the I²C networking technology is herein described and employed in the preferred embodiment, it should be appreciated that any type of networking technology, whether standardized, or proprietary, is within the spirit and scope of the present invention.

Still yet another feature of the present invention relates to the ability of the road marker (10), when used in an embodiment containing circuitry 50', to distinguish between artificial and natural light, thus enabling the use of the unit in areas that receive commercially powered night lighting, such as airports, major highways, municipal roadways, and parking lots. As described above, current-sense amplifier 45 may be configured to have its output toggle based upon a predetermined set point. The output is then provided as an input to one of the digital I/O ports of control means CPU. The digital output thus defines a natural light indicative signal/artificial light indicative signal, depending upon its current state, which is a function of whether the current being generated by solar collector 14 is above, or below the predetermined level, respectively.

In an alternate embodiment, device (45) can provide an analog signal indicative of the level of electrical current generated by solar collector (14). In this embodiment (not shown), the analog signal would be provided to an analog/digital convertor, such as device (43), and would be converted into a digital word for transmission to control means CPU. The CPU, through execution of appropriate preprogrammed steps, analyzes the digital word to determine whether it exceeds, or falls below the predetermined level. Based upon this determination, appropriate operation of the unit would ensue. For example, for those areas having artificial light, the road marker should nonetheless be operated, while, for natural daylight, the unit should be in a non-illuminated state, to save the battery.

Another feature of the road marker (10), is the ability for remote, non-contact reprogramming of the unit that would permit maintenance personnel to reprogram and/or upgrade existing and install the units to incorporate new or desired improvements or features.

To implement this feature, software is executed on control means CPU that polls port RB6, which is connected to phototransistor Q2. The port normally assumes either an on or off state. However, if the software determines modulation of the state of the input, an interrupt is generated and a handling routine is then executed. The phototransistor provides, in connection with appropriate software, means for receiving a preselected data pattern indicative of a programming mode of the road marker. In practice, a moving vehicle, passing in proximity to the marker unit and the phototransistor mounted on the face of the road marker, initiates reprogramming by way of an infrared transmitter (thereby establishing an infrared data link). The preselected data pattern may include a data-encrypted password that would be recognized by the marker as a valid command to allow reprogramming. The link may be, a simple asynchronous protocol, such as the well-known RS-232C protocol. Once in reprogramming mode, the control means CPU, in conjunction with the handling routine, accepts and stores the new operating program or, in other words, a second operating strategy, and would operate to change the operation of the marker by storing to non-volatile memory (44) the second predetermined operating strategy. This provides the advantage of being able to maintain the investment in the basic road marker, while providing the capability of continuous upgradability.

Finally, the road marker of the present invention features a novel technique of preparing for and activating a solar-powered road marker for operation. First, the road marker is manufactured with a light detector for sensing light, such as phototransistor Q2 as shown in FIG. 12. Next, the light detector is blocked, prior to field deployment, with a removable, light blocking label. Next, the road marker is deployed in the field. The next step of this technique involves removing the light blocking label. Software is provided to execute on control means CPU, as shown in FIG. 12, for sensing light with the phototransistor Q2, and generating a first-light signal in response thereto. The computer software, in response to the first light signal, proceeds to activate control means CPU. This activation entails various initialization procedures, and which may include a visual indication, to the installer, by way of a predefined power up sequence of the LED lamps (26).

Those skilled in the art will appreciate that variations may be made without deviating from the invention as claimed.

The embodiments of the invention for which an exclusive property or privilege is claimed are defined as follows:

1. A road marker for insertion into a road surface to an elevation flush or below that of the road surface, comprising:

an elongated housing extending along a longitudinal axis between first and second ends, said housing further having a pair of opposing side walls with upper margins wherein said upper margins are at an elevation below that of the road surface, said housing having a plenum in one of said first and second ends; and light dispensing means disposed in said plenum and configured to dispense light toward said one of said first and second ends opposite said plenum.

2. The road marker of claim 1 wherein said light dispensing means includes a light source.

3. The road marker of claim 1 wherein said light dispensing means includes retro-reflective media.

4. The road marker of claim 1 wherein said upper margins are at an elevation above that of the light dispensing means.

5. A road marker adapted for insertion into a road surface, comprising:

an elongated housing extending along a longitudinal axis between first and second ends, said housing further having a pair of opposing side walls with upper margins and a floor defining a central recess with said ends and side walls, said housing having a plenum in at least one of said first and second ends;

a battery disposed within said housing;

a solar collector disposed in said central recess for charging said battery;

a transparent sheet substantially overlaying said solar collector for permitting light to pass therethrough;

light emitting means disposed in said plenum and coupled to said battery for providing illumination;

said upper margins being at an elevation above an upper surface of said transparent sheet to thereby provide mechanical protection for said solar collector.

6. The road marker of claim 5 wherein said side walls of said central recess flare outwardly.

7. The road marker of claim 5 wherein said housing includes a recess end wall extending upwards from said floor into at least on of said first and second ends.

8. The road marker of claim 7 wherein said recess end wall flares outwardly.

9. The road marker of claim 8 further including recharging means for recharging said battery, said recharging means including a charge controller in series with said solar collector wherein said charge controller and said solar collector are in parallel with said battery.

10. The road marker of claim 7 wherein said plenum is defined by said recess end wall, said light emitting means in said plenum is at an elevation above said upper surface of said transparent sheet.

11. The road marker of claim 5 wherein said upper surface of said transparent sheet is disposed no more than ⅜th of an inch below said margins.

12. The road marker of claim 5 wherein said floor is at a depth disposed no more than ⅛th of an inch below said margins.

13. The road marker of claim 5 further including control means for selectively charging said battery during daylight hours, and for selectively illuminating said light emitting means during darkness.

14. A road marker, comprising:

a housing for affixing said road marker to a road;

light emitting means mounted to said housing for providing illumination;

a battery disposed in said housing for powering said light emitting means;

a solar collector rigidly mounted to said housing for charging said battery;

a layer of light transmissive silicone disposed upon and substantially overlaying said solar collector; and, a transparent sheet overlaying said layer of silicone for providing mechanical protection of said solar cell while permitting light rays to pass therethrough, wherein said housing, said solar collector, said layer of silicone and said transparent sheet define a shock resistant sandwich.

15. A road marker, comprising:

a housing for affixing said road marker to a road;

light emitting means mounted to said housing for providing illumination;

a battery disposed in said housing for powering said light emitting means;

a solar collector mounted to said housing for converting solar energy to electrical energy;

first determining and generating means coupled to said battery for determining when a battery output voltage is higher than a predetermined upper level and generating a charge inhibit signal in response thereto; and, inhibiting charging means responsive to said charge inhibit signal for inhibiting charging of said battery, wherein said first determining and generating means includes:

a resistive voltage divider having a common node and coupled between said battery and a ground node;

an analog-to-digital converter coupled to said common node for generating a digital word indicative of said battery output voltage; and, a microcontroller configured to generate said charge inhibit signal when said digital word exceeds said predetermined upper level.

16. The road marker of claim 15 further including:

second determining and generating means coupled to said battery for determining when said battery output voltage is lower than a predetermined lower level and generating a discharge inhibit signal; and, inhibiting discharge means responsive to said discharge inhibit signal for inhibiting discharge, but permitting charge of, said battery until said battery output voltage exceeds said predetermined lower level.

17. A road marker comprising:

a housing for affixing said road marker to a road;

light emitting means mounted to said housing for providing illumination;

a battery disposed in said housing for powering said light emitting means;

a solar collector mounted to said housing for converting solar energy to electrical energy;

first determining and generating means coupled to said battery for determining when a battery output voltage is higher than a predetermined upper level and generating a charge inhibit signal in response thereto;

inhibiting charging means responsive to said charge inhibit signal for inhibiting charging of said battery;

second determining and generating means coupled to said battery for determining when said battery output voltage is lower than a predetermined lower level and generating a discharge inhibit signal;

inhibiting discharging means responsive to said discharge inhibit signal for inhibiting discharge, but permitting charge of, said battery until said battery output voltage exceeds said predetermined lower level; and, full cycle discharge and charge means coupled to said battery and said solar collector for providing full cycle discharge and charge of said battery.

18. A road marker, comprising:

a housing for affixing said road marker to a road;

light emitting means mounted to said housing for providing illumination;

a battery disposed in said housing for powering said light emitting means;

a solar collector mounted to said housing for converting solar energy to electrical energy;

determining and generating means coupled to said battery for determining when a battery output voltage is lower than a predetermined lower level and generating a discharge inhibit signal; and, inhibiting discharge means responsive to said discharge inhibit signal for inhibiting discharge, but permitting charge of, said battery until said battery output voltage exceeds said predetermined lower level wherein said determining and generating means includes:

a resistive voltage divider having a common node and coupled between said battery and a ground node;

an analog-to-digital converter coupled to said common node for generating a digital word indicative of said battery output voltage; and, a microcontroller configured to generate said discharge inhibit signal when said digital word exceeds said predetermined lower level.

19. A road marker comprising:

a housing for affixing said road marker to a road;

light emitting means mounted to said housing for providing illumination;

a battery disposed in said housing for powering said light emitting means;

a solar collector mounted to said housing for converting solar energy to electrical energy;

determining and generating means coupled to said battery for determining when a battery output voltage is lower than a predetermined lower level and generating a discharge inhibit signal;

inhibiting discharge means responsive to said discharge inhibit signal for inhibiting discharge, but permitting charge of, said battery until said battery output voltage exceeds said predetermined lower level; and, full cycle discharge and charge means coupled to said battery and said solar collector for providing full cycle discharge and charge of said battery.

20. A road marker, comprising:

a housing for affixing said road marker to a road;

light emitting means mounted to said housing for providing illumination;

a battery disposed in said housing for powering said light emitting means;

a solar collector mounted to said housing for converting solar energy to electrical energy;

full cycle discharge and charge means coupled to said battery and said solar collector for providing full cycle discharge and charge of said battery.

21. The road marker of claim 20 wherein said means for providing full cycle discharge and charge of said battery includes a microcontroller.

22. The road marker of claim 20, further comprising:

determining and generating means coupled to said battery for determining when said battery output voltage exceeds a predetermined upper level and generating a charge inhibit signal in response thereto; and, inhibiting charging means responsive to said charge inhibit signal for inhibiting charging of said battery.

23. A method of preparing for and activating a solar-powered road marker for operation, comprising the steps of:
(A) manufacturing a solar-powered road marker with a light detector for sensing light;
(B) blocking the light detector, prior to field deployment, with a removable, light blocking label;
(C) deploying the road marker in the field;
(D) removing the light blocking label;
(E) sensing light with the light detector and generating a first-light signal in response thereto; and,
(F) activating a control means of the road marker in response to the first-light signal.

24. A networkable road marker connectable to networking media, comprising:
a housing for affixing said road marker to a road;
light emitting means mounted to said housing for providing illumination;
a battery disposed in said housing for powering said light emitting means;
a solar collector mounted to said housing for converting solar energy to electrical energy;
detecting means connectable to said media for detecting a unique predetermined address broadcast over said media and responding thereto to said detection by executing a command associated with said broadcast address.

25. The road marker of claims 24, wherein said detecting means includes a microcontroller.

26. A non-contact programmable road marker, comprising:
a housing for affixing said road marker to a road;
light emitting means mounted to said housing for providing illumination;
a battery disposed in said housing for powering said light emitting means;
a solar collector mounted to said housing for converting solar energy to electrical energy;
control means for controlling the operation of said road marker;
memory means coupled to said control means for storing a first predetermined strategy for operating said road marker;
receiving means for receiving a preselected data pattern indicative of a programming mode of said road marker;
said control means further including reprogramming means responsive to said received data pattern for reprogramming said memory means with a second predetermined strategy received by said receiving means to thereby change the operation of said road marker in accordance with said second predetermined strategy.

27. A road marker, comprising:
a housing for affixing said road marker to a road;
light emitting means mounted to said housing for providing illumination;
a battery disposed in said housing for powering said light emitting means;
a solar collector mounted to said housing responsive to solar energy for generating an electrical current;
measuring means responsive to said electrical current for generating a current signal indicative of a level of electrical current generated;
evaluation means for determining when said current signal exceeds a predetermined level and generating a natural light indicative signal in response thereto, said evaluation means being further provided for generating an artificial light indicative signal when said current signal falls below said predetermined level; and,
control means coupled to said evaluation means for varying the operation of said road marker in accordance with said natural light indicative signal and said artificial light indicative signal.

28. The road marker of claim 27 wherein said control means further includes nighttime illumination means for causing said light emitting means to provide illumination during nighttime hours under artificial light.

29. A road marker comprising:
a housing for affixing said road marker to a road;
light emitting means mounted to said housing for providing illumination;
a battery disposed in said housing for powering said light emitting means;
a solar collector mounted to said housing responsive to solar energy for generating an electrical current;
measuring means responsive to said electrical current for generating a current signal indicative of a level of electrical current generated;
evaluation means for determining when said current signal exceeds a predetermined level and generating a natural light indicative signal in response thereto, said evaluation means being further provided for generating an artificial light indicative signal when said current signal falls below said predetermined level;
control means coupled to said evaluation means for varying the operation of said road marker in accordance with said natural light indicative signal and said artificial light indicative signal;
wherein said measuring means includes a differential amplifier responsive to said electrical current.

30. The road marker of claim 29 further including analog-to-digital conversion means for converting an output of said differential amplifier into digital representation of said current signal.

31. A road marker, comprising:
a housing for affixing said road marker to a road;
light emitting means mounted to said housing for providing illumination;
a battery disposed in said housing for powering said light emitting means;
a solar collector mounted to said housing for converting solar energy to electrical energy;
control means for controlling the operation of said light emitting means;
said light emitting means including a lens and at least one light emitting diode for emitting light rays, said lens being a substantially solid and having a top surface, a front sloping surface, a rear sloping surface, and an elongated channel extending from said rear sloping surface relatively inwardly for receiving said light emitting diode, said channel having a terminal surface substantially parallel to said front sloping surface, wherein said parallel surfaces realign said light rays whereby light rays emerging from said lens appear to a viewer to originate from below said top surface.

32. The road marker of claim 31 further including a retro-reflective material disposed on said rear sloping surface.

33. A tab for installing a road marker below a grade of a road surface, comprising:

a planar stop portion for retaining said tab in a fixed relationship with the road surface;

a neck portion extending downwardly from said stop, and, a base portion extending from said neck portion for engaging and retaining the road marker;

said base portion being downwardly disposed relative to said stop, such that the road marker is installed a predetermined distance below the road grade.

* * * * *